US 6,680,631 B2

(12) United States Patent
Solomon

(10) Patent No.: US 6,680,631 B2
(45) Date of Patent: Jan. 20, 2004

(54) SETTING THE SPEED OF CLOCKED CIRCUITRY

(75) Inventor: Gary A. Solomon, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/819,003

(22) Filed: Mar. 27, 2001

(65) Prior Publication Data

US 2002/0171456 A1 Nov. 21, 2002

(51) Int. Cl.[7] ............................................. H03B 19/00
(52) U.S. Cl. ........................ 327/113; 327/39; 327/42; 713/501
(58) Field of Search ................. 327/39–42, 44, 327/46, 47, 113, 141, 144, 145; 326/30; 375/362, 364; 395/555, 556, 559; 710/104, 105; 713/501

(56) References Cited

U.S. PATENT DOCUMENTS

| 5,274,337 A | * | 12/1993 | Young et al. | 328/138 |
| 5,298,867 A | * | 3/1994 | Mestha | 327/233 |
| 5,434,996 A | * | 7/1995 | Bell | 395/550 |
| 5,438,599 A | * | 8/1995 | Lincoln | 377/20 |
| H1489 H | * | 9/1995 | Doan et al. | 364/550 |
| 5,450,458 A | * | 9/1995 | Price et al. | 375/356 |
| 5,774,702 A | * | 6/1998 | Mitsuishi et al. | 395/556 |
| 5,809,291 A | | 9/1998 | Munoz-Bustamante et al. | 395/556 |
| 5,978,869 A | | 11/1999 | Guthrie et al. | 710/60 |
| 6,020,838 A | * | 2/2000 | Knudsen et al. | 341/143 |
| 6,140,850 A | * | 10/2000 | Inoue | 327/141 |

FOREIGN PATENT DOCUMENTS

EP 0 702 308 3/1996

\* cited by examiner

Primary Examiner—Kenneth B. Wells
Assistant Examiner—An T. Luu
(74) Attorney, Agent, or Firm—Fish & Richardson P.C.

(57) ABSTRACT

A way is disclosed of establishing at system reset of both physical operating speed limitations imposed on a secondary bus by a circuit layout as well as the speed capabilities of agents attached to the bus, so that a secondary bus clock speed may be set at the highest permissible speed existing at the time of system reset.

59 Claims, 3 Drawing Sheets

SETTING THE SPEED OF CLOCKED CIRCUITRY

FIELD OF THE INVENTION

This invention relates setting a speed of clocked circuitry.

BACKGROUND OF THE INVENTION

When laying out a computer design, and in accordance with at least one industry standard specification (PCI Local Bus Specification Rev. 2.2 published by the PCI Special Interest Group) the computer main (primary) bus over which a central processing unit (CPU) communicates with memory is frequently electronically isolated from other devices which may also from time to time wish to communicate with the CPU or memory. This isolation offers advantages such as the increased bus speed resulting from decreased parasitic capacitance, and allowing slower devices to communicate with the primary bus while not requiring that the primary bus be permanently slowed down to the speed of the slowest device (agent) on the bus.

A class of devices called bridges provides electrical isolation of a computer main bus from one or more secondary buses controlled by one or more bridges. A bridge participates in managing communication between a secondary bus and the main or primary computer bus. The bridge, in cooperation with the CPU, controls the sequencing of operations and access to the primary bus in accordance with the bus specification. An agent on a secondary bus requesting to communicate with another agent (which could either be on the same secondary bus, another secondary bus or on the primary bus) communicates this fact to the bridge controlling the secondary bus on which the requesting agent is attached. The agent asserts one or more signals requesting permission to send or receive over the primary bus. The bridge communicates with the CPU and upon receipt of the necessary acknowledgment and permission signals, allows the requesting device to access resources that reside on or beyond the primary bus through the bridge. In effect, the bridge operates as a traffic cop between the primary bus and the secondary bus. It is not necessary that the operating frequency of the secondary bus be the same as the operating frequency of the primary bus. A bus bridge typically takes care of providing any necessary synchronization between the two bus clocking domains.

Frequently, the secondary bus provides one or more slots into which circuit cards (agents) may be inserted by a user. In an open access computer system such as a personal computer with user accessible I/O expansion slots, it is generally not known at the time a particular circuit board is designed what specific peripheral cards may be inserted into the expansion slots. Circuit cards may be changed by users from time to time. Different cards may have different speed capabilities. For example, one card may have a maximum operating frequency of 66 MHz, while another card may have a maximum operating frequency of 133 MHz.) Current industry bus architecture specifications often provide a means of detecting the maximum operating speed capabilities of agents inserted into slots on the secondary bus. While this is necessary information, it is not sufficient to correctly establish the proper maximum operating frequency of the bus.

The physical loading of the secondary bus, primarily dependent upon the number of slots on a secondary bus as well as other design layout considerations, has an effect on the maximum operating frequency at which the secondary bus may operate. The greater the number of slots, generally, the lower the maximum speed at which the secondary bus is capable of operating. Simply configuring a secondary bus to be clocked at a fixed frequency equal to the maximum speed based upon physical loading alone does not take into account agents which may be inserted into slots on the secondary bus. One or more such agents may be slower than the fixed established secondary bus operating frequency, and accordingly, such agents may not operate correctly on the secondary bus under such circumstances.

For example, a two slot secondary bus may be capable of operating at speeds up to 66 MHz. Hard wiring the bus speed to 66 MHz means that slower devices, such as agents capable of operating no faster than 33 MHz, will not operate correctly. A faster card, one that is capable of running at 133 MHz, should be able to be run at the slower speed.

The details of one or more embodiments of the invention are set forth in the accompanying drawings and the description below. Other features and advantages of the invention will become apparent from the description, the drawings, and the claims.

DETAILED DESCRIPTION

The maximum operating frequency of devices attached to a secondary bus and the maximum operating frequency of the secondary bus imposed by the physical layout and electrical loading characteristics of the secondary bus, may be determined dynamically no matter what agents may be inserted into one or more slots connected to the secondary bus.

Figure 1:
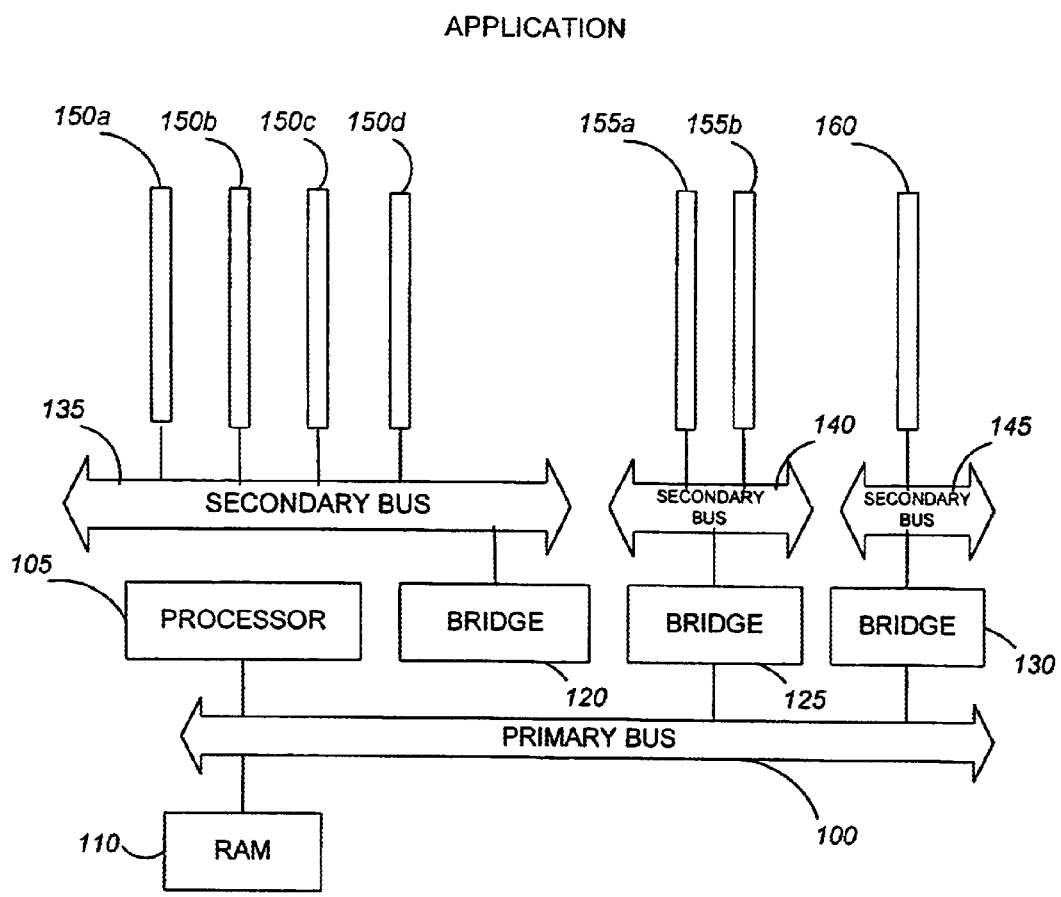
FIG. 1 is a block diagram of a computer circuit board layout.

With reference to FIG. 1, in one example, a primary bus 100 is connected through a primary bridge 106 to a central processor 105, and RAM memory 110. In this example, three bridges 120, 125 and 130 are shown. Bridge 120 is connected through secondary bus 135 to I/O expansion slots 150a, 150b, 150c and 150d. Bridge 125 is connected through secondary bus 140 to slots 155a and 155b. Bridge 130 is connected through secondary bus 145 to but a single slot 160. Other configurations are possible.

The greater the number of slots provided for by a given bus, the greater the loading and hence the slower the maximum operating speed of the bus may be. For example, a four slot bus may only be capable of operating at frequencies at or below 66 MHz. A two slot bus may be capable of operating at speeds of 100 MHz and lowerd, while a single slot bus may be capable of operating at speeds of one 133 MHz and lower.

A particular bus specification may include the capability of operating at speeds of 133 MHz, 100 MHz, 66 MHz and 33 MHz. Which speed (frequency) the bus should in fact be operated at depends upon the physical layout and electrical loading of the bus. However, the allowable operating speed (i.e., clock frequency) of the bus also depends upon the capabilities of the agents that are inserted into the slots attached to the bus. If a single slot bus were simply hard wired to operate at 133 MHz, it would only work with a 133 MHz agent. Slower agents would not operate properly. However, if a single slot bus were hard wired to operate at 66 MHz, while it would operate with 66 MHz and faster agents, it would do so without taking advantage of the higher speed capability of 100 MHz and 133 MHz agents.

Figure 2:
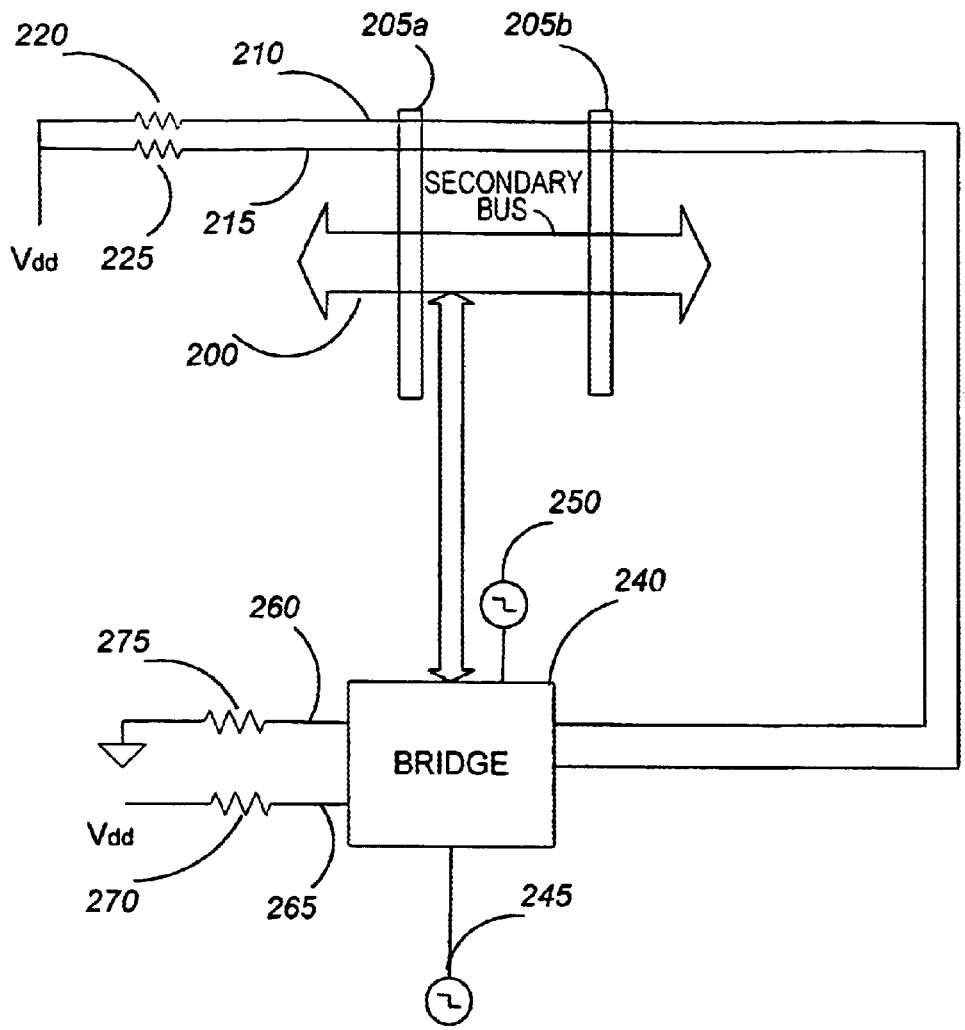
FIG. 2. is a block diagram of a bridge and secondary bus.

Referring to FIG. 2, a simplified bridge circuit is shown having a secondary bus 200 and two slots 205a and 205b. Using the present example, this secondary bus 200 is capable of being operated at a maximum frequency of 100 MHz based solely upon the physical layout and loading.

When an agent is inserted into a slot, it may or may not be able to operate at the maximum speed of which the attached secondary bus is capable. Bus specifications frequently include having one or more signals on the bus present which may be used to encode information regarding the speed capability of the slowest agent attached to the bus. FIG. 2 shows two such signals 210 and 215, which when no agent is inserted into a slot on the bus, are held at a fixed voltage (binary 1) state by resistors 220 and 225. When an agent is inserted into a slot, one or more of these signals may be grounded according to the encoding scheme. For example, assume the following encoding scheme shown in Table 1:

TABLE 1

| Signal 210 | Signal 215 | Maximum Speed |
|---|---|---|
| 0 | 0 | 33 MHz |
| 0 | 1 | 66 MHz |
| 1 | 0 | 100 MHz |
| 1 | 1 | 133 MHz |

Under this encoding scheme, an agent in slot 205a which does not ground (logical 1) signals 210 and 215 indicates that it is capable of operating at speeds up to 133 MHz. A second agent in slot 205b grounding signals 210 and 215 would indicate that the maximum operating speed of at least one device on the bus was 66 MHz. (Grounding pins is a "wired or" process. process, resulting in an encoding which is the code for the slowest agent attached to the bus.)

If the secondary bus 200 were merely hardwired with an operating frequency of 100 MHz based upon its physical capabilities absent any agents, the faster device in slot 205a would operate properly while the slower device in slot 205b would be operating in excess of its maximum capabilities.

Bridge 240 is provided with an input clock signal 245 from which it may derive (by division or multiplication) an output clock signal 250. The output clock signal 250 is determined not only by the state of signals 210 and 215 as described above, but also by the state of signals 260 and 265. Signals 260 and 265 may either be grounded or held in a binary 1 state by a pullup resistor. In this example, signal 260 is grounded through pulldown resistor 275, while signal 265 is connected through pullup resistor 270 to a binary 1 state. In this example, the states of signals 260 and 265 correspond to an encoding scheme as shown in table 2:

TABLE 2

| Signal 260 | Signal 265 | Maximum Speed |
|---|---|---|
| 0 | 0 | 33 MHz |
| 0 | 1 | 66 MHz |
| 1 | 0 | 100 MHz |
| 1 | 1 | 133 MHz |

From the example as shown, signal 260 is in the binary 1 state, and signal 265 is in the binary 0 state. Accordingly, 100 MHz is set as the maximum operating frequency of the output clock 250. However, in our example, an agent has been inserted into slot 205b which is only capable of operation at 66 MHz or slower. Accordingly, bridge 240 sets the output clock frequency 250 for secondary bus 200 at 66 MHz. If the agent in slot 205b were to be removed, then the slowest agent (in slot 205a) is capable of operating at up to 133 MHz, while the highest bus speed of which the secondary bus 200 is capable is 100 MHz to which speed bridge 240 sets the output clock frequency 250.

Having additional information regarding the physical speed limitations of a secondary bus together with information regarding the speed of the slowest agent on a bus allows for a dynamic change of secondary bus speed to the fastest at which the current circumstances will allow. Typically, the state of the input signals encoding the speed information of both the agents and the physical layout will be read at the time of system reset.

Figure 3:
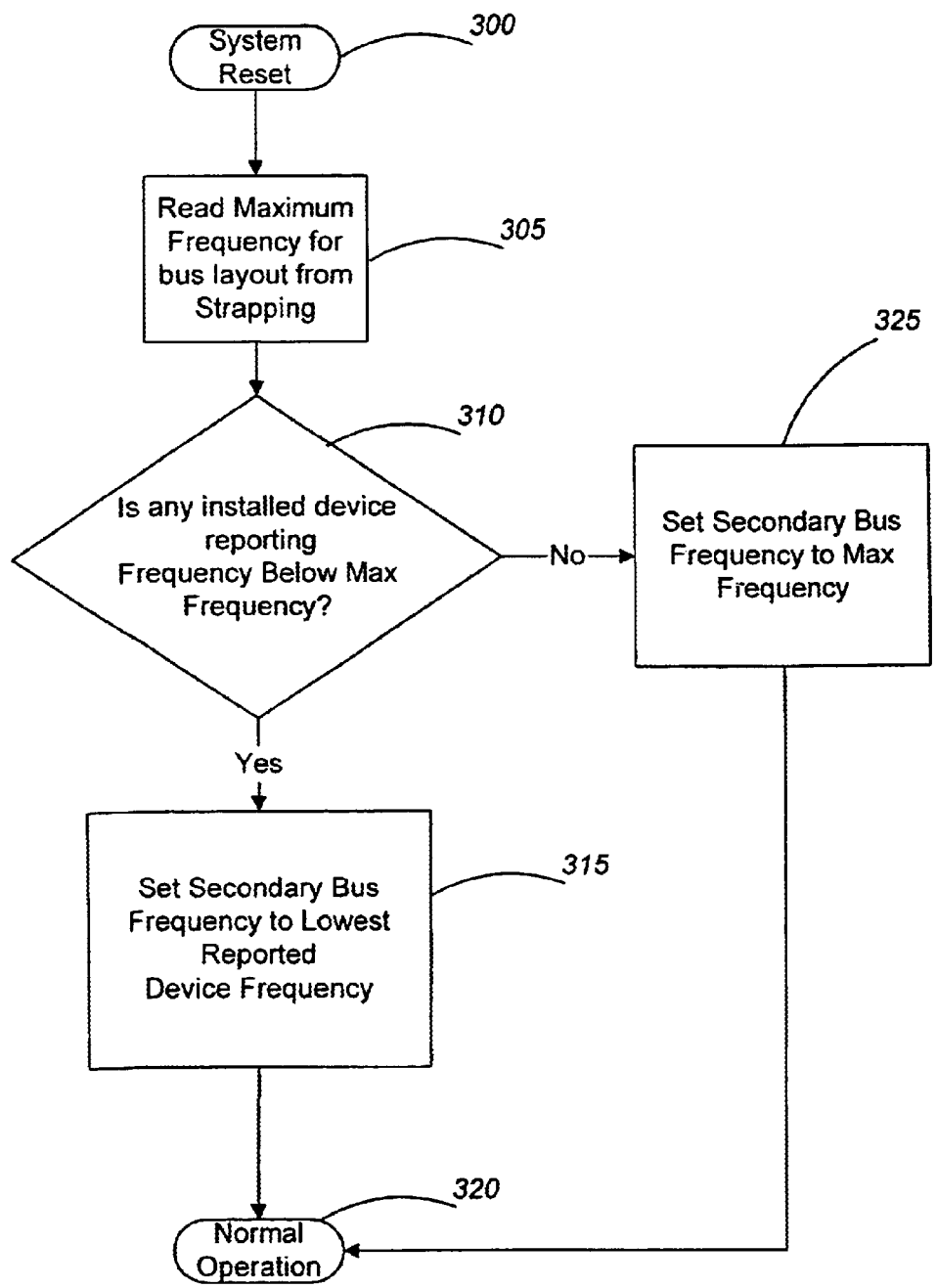
FIG. 3. is a flow chart of a decision process to set a bus speed.

Referring to FIG. 3, a decision tree 300 shows how the maximum frequency is arrived at. Beginning at system reset, the maximum frequency for the physical layout is read 305 from the input signals which may be hard-wired (strapped) to the encoded frequency by the circuit designer. Next, the signals on the bus carrying the encoded highest permissible frequency information for the slowest agent on the bus are read 310. If there is a device which requires operation below the physical maximum frequency of the bus 310, the bus speed is set to the lowest reported device frequency 315 and normal operation ensues 320. Otherwise, the secondary bus frequency is set to the maximum frequency for the physical layout 325.

The PCI 2.2 bus specification provides for a S_M66EN pin, which if asserted (i.e., 1) indicates a device capable of operation at 66 MHz. The PCI-X specification provides for a second signal, S_PCIXCAP which if asserted indicates 133 MHz capability, and if not asserted, 66 MHz capability. The system resets on S_RST# being asserted. Accordingly, encoding schemes may be utilized which take these signals into account and indicate appropriate bus speeds.

Other embodiments are within the scope of the following claims. For example, different encoding schemes and frequencies may be used. Different numbers of signals may be used to do the encoding. The inputs used for encoding may include more than one line and more than two logical states.

What is claimed is:

1. A method comprising
sensing a state at a first input of a bridge circuit, the state comprising one of at least two logical conditions encoded in a bus signal, the state representing information regarding the speed capability of an agent electrically connected to the bus; and
based upon the state of the first input, setting a variable frequency output signal of an electronic circuit to a predetermined frequency.

2. The method of claim 1 in which the predetermined frequency comprises at least one of 33 MHz, 66 MHZ, 100 MHZ and 133 MHz.

3. The method of claim 1 further comprising sensing the state of the first input synchronously with a second input.

4. The method of claim 3 wherein the bridge circuit further comprises a third input having one of at least two logical states; and further comprising
sensing the third input;
based upon the sensing of the first and third inputs, setting the output signal to a predetermined frequency.

5. The method of claim 4 wherein the first input comprises an encoding of a frequency and the third input signal comprises an encoding of a maximum clock frequency of an agent.

6. The method of claim 4 wherein the third input signal comprises S_M66EN.

7. The method of claim 4 wherein
the third input signal comprises S_M66EN and S_PCIXCAP,
the second input signal comprises S_RST#; and
the first and third inputs are sampled during a period in which S_RST#is asserted.

8. The method of claim 1 in which the variable frequency output is derived from an input clock signal.

9. A system comprising
a bridge circuit having:
a first input to sense at least two logical states encoded in a bus signal, the states representing information regarding the speed capability of an agent electrically connected to the bus; and
an output;
the bridge circuit to sample the first input, and, based upon the sampling, to set the output to one of several predetermined frequency bases.

10. The system of claim 9 in which the predetermined frequencies comprises at least one of 33 MHz, 66 MHZ, 100 MHZ and 133 MHz.

11. The system of claim 9 in which the one of several predetermined frequency bases is derived from an input clock signal.

12. The system of claim 9 wherein the sensing is done synchronously with a second input signal.

13. The system of claim 12 wherein the bridge circuit further comprises a third input which may be at one of at least two logical states; and further comprising circuitry to sense the state of the third input; and
the bridge circuit, based upon the states of the first input and third input, to set the output to one of several predetermined frequency bases.

14. The system of claim 13 wherein the first input receives an encoding of a maximum clock frequency and the third input receives an encoding of a maximum clock frequency of an agent.

15. The system of claim 13 wherein the third input comprises S_M66EN.

16. The system of claim 13 wherein
the third input comprises two lines comprising S_M66EN and S_PCIXCAP;
a second input signal comprises S_RST#; and
the state of the first and third inputs is sensed during a period in which S_RSTH is asserted.

17. The system of claim 9 in which the output is used as the operating frequency of a secondary bus.

18. An article of manufacture comprising
an integrated circuit comprising a bridge;
the bridge having a first input to sense at least two logical states encoded in a bus signal and deriving at least one predetermined output frequency, the states representing information regarding the speed capability of an agent electrically connected to the bus;
the bridge having electronic circuitry to cause the bridge to sense the first input, and based upon the sensing, to derive the output frequency.

19. The article of claim 18 in which the at least one predetermined frequency comprises at least one frequency chosen from the set consisting of 33 MHz, 66 MHZ, 100 MHZ and 133 MHz.

20. The article of claim 18 in which the output frequency is derived from an input clock signal.

21. The article of claim 18 wherein the sensing is done synchronously with a second input to the circuit.

22. The article of claim 21 wherein the bridge further comprises
a third input;
circuitry to sense the logical state of the third input and, based upon the sensing of the first and third inputs, to set the output frequency.

23. The article of claim 22 wherein the first input comprises an encoding of a maximum clock frequency and the third input comprises an encoding of a maximum clock frequency of an agent.

24. The article of claim 22 wherein the third input signal comprises S_M66EN.

25. The article of claim 22 wherein
the third input signal comprises S_M66EN and S_PCIXCAP;
a second input signal comprises S_RST#; and
the first and third inputs are sampled during a period in which S_RST# is asserted.

26. The article of claim 18 in which the output is used as the operating frequency of a secondary bus.

27. A method comprising
sensing a first input signal at a first input of an electronic circuit, the first input signal comprising an encoding of a frequency;
sensing a second input signal at a second input of the electronic circuit synchronously with the first input;
sensing a third input signal at a third input of an electronic circuit, wherein the third input signal comprises an encoding of a maximum clock frequency of an agent; and
based upon the first and third signals, setting a variable frequency output of the electronic circuit to a predetermined frequency.

28. The method of claim 27 wherein the third input signal comprises S_M66EN.

29. The method of claim 27 wherein
the third input signal comprises S_M66EN and S_PCIXCAP,
the second input signal comprises S_RST#; and
the first and third inputs are sampled during a period in which S RST#is asserted.

30. A system comprising
a bridge circuit having:
a first input to sense at least two logical states, said first input to receive an encoding of a maximum clock frequency;
a second input;
a third input which may be at one of at least two logical states, said third input to receive an encoding of a maximum clock frequency of an agent; and
a variable frequency output;
the bridge to sample the first input and the third input, and, based upon the sampling, to set the variable frequency output to a predetermined frequency base.

31. The system of claim 30 wherein the third input comprises S_M66EN.

32. The system of claim 30 wherein
the third input comprises two lines comprising S_M66EN and S_PCIXCAP;
a second input signal comprises S_RST#; and
the state of the first and third inputs is sensed during a period in which S_RST# is asserted.

33. The system of claim 30 in which the predetermined frequencies comprises at least one of 33 MHz, 66 MHZ, 100 MHZ and 133 MHz.

34. The system of claim 30 in which the variable frequency output is derived from an input clock signal.

35. The system of claim 30 wherein the sensing is done synchronously with a second input signal.

36. An article of manufacture comprising
an integrated circuit comprising a bridge having:
a first input capable of sensing at least two logical states and deriving a variable frequency output, wherein the first input comprises an encoding of a maximum clock frequency;
a second input;
a third input, wherein the third input comprises an encoding of a maximum clock frequency of an agent; and
an output
the bridge having electronic circuitry to cause the bridge to sense the first input and the third input and, based upon the sensing of the first input and the third input, to set an output to at least one predetermined frequency.

37. The article of claim 36 wherein the third input signal comprises S_M66EN.

38. The article of claim 36 wherein
the third input signal comprises S_M66EN and S_PCIXCAP;
a second input signal comprises S_RST#; and
the first and third inputs are sampled during a period in which S_RST#is asserted.

39. The article of claim 36 in which the at least one predetermined frequency comprises at least one frequency chosen from the set consisting of 33 MHz, 66 MHZ, 100 MHZ and 133 MHz.

40. The article of claim 36 in which the variable frequency output is derived from an input clock signal.

41. The article of claim 36 wherein the sensing is done synchronously with a second input to the circuit.

42. A method comprising
sensing a state at a first input of a bridge circuit, the state comprising one of at least two logical conditions;
sensing a state of a second input of the bridge circuit synchronously with the sensing of the first input;
sensing a third input of the bridge circuit; and
based upon the state of the first input and the third input, setting a variable frequency output signal of an electronic circuit to a predetermined frequency.

43. The method of claim 42 wherein the first input comprises an encoding of a frequency and the third input signal comprises an encoding of a maximum clock frequency of an agent.

44. The method of claim 42 wherein the third input signal comprises S_M66EN.

45. The method of claim 42 wherein
the third input signal comprises S_M66EN and S_PCIXCAP,
the second input signal comprises S_RSTH; and
the first and third inputs are sampled during a period in which S_RST# is asserted.

46. The method of claim 42 in which the predetermined frequency comprises at least one of 33 MHz, 66 MHZ, 100 MHZ and 133 MHz.

47. A system comprising
a bridge circuit having:
a first input to sense at least two logical states
a second input to sense at least two logical states
a third input to sense at least two logical states; and
an output;
the bridge circuit to synchronously sample the first input, second input, and third input, and, based upon the sampling, to set the output to one of several predetermined frequency bases.

48. The system of claim 47 wherein the first input receives an encoding of a maximum clock frequency and the third input receives an encoding of a maximum clock frequency of an agent.

49. The system of claim 47 wherein the third input comprises S_M66EN.

50. The system of claim 47 wherein
the third input comprises two lines comprising S_M66EN and S_PCIXCAP;
a second input signal comprises S_RST#; and
the state of the first and third inputs is sensed during a period in which S_RST# is asserted.

51. The system of claim 47 in which the predetermined frequencies comprises at least one of 33 MHz, 66 MHZ, 100 MHZ and 133 MHz.

52. The system of claim 47 in which the one of several predetermined frequency bases is derived from an input clock signal.

53. An article of manufacture comprising
an integrated circuit comprising a bridge, the bridge having:
a first input to sense at least two logical states;
a second input to sense at least two logical states;
a third input to sense at least two logical states;
an output; and
circuitry to sample the logical states of the first and third input and to derive a predetermined frequency; and
circuitry to set the output to the predetermined frequency.

54. The article of claim 53 wherein the first input comprises an encoding of a maximum clock frequency and the third input comprises an encoding of a maximum clock frequency of an agent.

55. The article of claim 53 wherein the third input signal comprises S_M66EN.

56. The article of claim 53 wherein
the third input signal comprises S_M66EN and S_PCIXCAP;
a second input signal comprises S_RST#; and
the first and third inputs are sampled during a period in which S_RST# is asserted.

57. The article of claim 53 in which the output is used as the operating frequency of a secondary bus.

58. The article of claim 53 in which the at least one predetermined frequency comprises at least one frequency chosen from the set consisting of 33 MHz, 66 MHZ, 100 MHZ and 133 MHz.

59. The article of claim 53 in which the output frequency is derived from an input clock signal.

* * * * *